(12) United States Patent
Hatabu

(10) Patent No.: US 7,813,558 B2
(45) Date of Patent: Oct. 12, 2010

(54) TEMPLATE MATCHING METHOD, TEMPLATE MATCHING APPARATUS, AND RECORDING MEDIUM THAT RECORDS PROGRAM FOR IT

(75) Inventor: Atsushi Hatabu, Tokyo (JP)

(73) Assignee: NEC Corporation, Tokyo (JP)

( * ) Notice: Subject to any disclaimer, the term of this patent is extended or adjusted under 35 U.S.C. 154(b) by 1016 days.

(21) Appl. No.: 10/594,897

(22) PCT Filed: Jan. 11, 2006

(86) PCT No.: PCT/JP2006/300180

§ 371 (c)(1),
(2), (4) Date: Sep. 29, 2006

(87) PCT Pub. No.: WO2006/075594

PCT Pub. Date: Jul. 20, 2006

(65) Prior Publication Data

US 2008/0273800 A1      Nov. 6, 2008

(30) Foreign Application Priority Data

Jan. 11, 2005   (JP)   ............................. 2005-003985

(51) Int. Cl.
*G06K 9/62* (2006.01)
(52) U.S. Cl. ..................................................... 382/209
(58) Field of Classification Search .................. None
See application file for complete search history.

(56) References Cited

U.S. PATENT DOCUMENTS 5,675,826 A     10/1997     Manze et al.

(Continued)

FOREIGN PATENT DOCUMENTS

JP      6-233282 (A)       8/1994

(Continued)

OTHER PUBLICATIONS

A Murat Tekalp, "Chapter 6—Block-based Methods," Digital Video Processing, Prentice Hall, 1995, pp. 95-116.

(Continued)

*Primary Examiner*—Samir A. Ahmed
*Assistant Examiner*—Fred Hu
(74) *Attorney, Agent, or Firm*—Foley & Lardner LLP

(57) ABSTRACT

There is provided a template matching method having a small amount of calculation and high detection accuracy. The amount of calculation is reduced while minimizing the degradation of the detection accuracy by calculating the similarity between a template image region and a reference image region at rough position intervals and estimating by interpolation of the similarity at a position where it is not calculated from the similarity calculated at a peripheral position. At the time, even if the gradient of a similarity greatly changes at the minimal point, estimation can be realized with high accuracy by executing estimation making use of the directional gradients of the similarity obtained in plural different directions independently. Additionally, occurrence of wrong detection is avoided by the restriction to disable the difference between the estimated similarity and adjacent similarity to exceed a threshold, which is defined based on the similarity between the template image region and the image region obtained by moving the template image region in the same direction as or in the opposite direction to the direction of estimation.

12 Claims, 14 Drawing Sheets

1 : FIRST STEP MATCHING CANDIDATE
①: FIRST STEP MATCHING RESULT
2 : SECOND STEP MATCHING CANDIDATE

U.S. PATENT DOCUMENTS

| | | |
|---|---|---|
| 6,597,819 B1 | 7/2003 | Ito |
| 7,599,512 B2 | 10/2009 | Shimizu et al. |
| 2006/0146187 A1 * | 7/2006 | Handjojo et al. ............ 348/448 |

FOREIGN PATENT DOCUMENTS

| JP | 06-326980 | 11/1994 |
|---|---|---|
| JP | 7-129770 (A) | 5/1995 |
| JP | 11-88891 (A) | 3/1999 |
| JP | 11-214485 | 8/1999 |
| JP | 2001-008024 A | 1/2001 |
| JP | 2003-150898 A | 5/2003 |
| JP | 2003-319171 A | 11/2003 |
| WO | WO 2004/063991 (A1) | 7/2004 |
| WO | WO 2004063991 A1 * | 7/2004 |

OTHER PUBLICATIONS

M. Shimizu et al., "Significance and Attributes of Subpixel Estimation on Area-Based Matching," Systems and Computers in Japan, vol. 34:12, 2003, pp. 1-10.

K. Tanaka et al., "A Parametric Template Method and Its Application to Robust Matching," IEEE Conference on Computer Vision and Pattern Recognition, 2000, pp. 1-8.

* cited by examiner

FIG.2

1 : FIRST STEP MATCHING CANDIDATE
①: FIRST STEP MATCHING RESULT
2 : SECOND STEP MATCHING CANDIDATE

FIG. 5

(a) THINNING OUT AT 2-PIXEL INTERVALS IN VERTICAL AND LATERAL DIRECTIONS

| 1 | | 1 | 2 | 1 | 2 | 1 | 2 | 1 | 2 | 1 | | 1 |
|---|---|---|---|---|---|---|---|---|---|---|---|---|
| 1 | | 1 | 2 | 1 | 2 | 1 | 2 | 1 | 2 | 1 | | 1 |
| 3 | | 3 | 4 | 3 | 4 | 3 | 4 | 3 | 4 | 3 | | 3 |
| 1 | | 1 | 2 | 1 | 2 | 1 | 2 | 1 | 2 | 1 | | 1 |
| 3 | | 3 | 4 | 3 | 4 | 3 | 4 | 3 | 4 | 3 | | 3 |
| 1 | | 1 | 2 | 1 | 2 | 1 | 2 | 1 | 2 | 1 | | 1 |
| 3 | | 3 | 4 | 3 | 4 | 3 | 4 | 3 | 4 | 3 | | 3 |
| 1 | | 1 | 2 | 1 | 2 | 1 | 2 | 1 | 2 | 1 | | 1 |
| 3 | | 3 | 4 | 3 | 4 | 3 | 4 | 3 | 4 | 3 | | 3 |
| 1 | | 1 | 2 | 1 | 2 | 1 | 2 | 1 | 2 | 1 | | 1 |
| | | | | | | | | | | | | |
| 1 | | 1 | 2 | 1 | 2 | 1 | 2 | 1 | 2 | 1 | | 1 |

(b) THINNING OUT AT 2-PIXEL INTERVALS IN LATERAL DIRECTION 1

| 1 | 2 | 1 | 2 | 1 | 2 | 1 | 2 | 1 | 2 | 1 | 2 | 1 |
|---|---|---|---|---|---|---|---|---|---|---|---|---|
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |
| 1 | 2 | 1 | 2 | 1 | 2 | 1 | 2 | 1 | 2 | 1 | 2 | 1 |

(c) THINNING OUT AT 2-PIXEL INTERVALS IN LATERAL DIRECTION 2

| 1 | 2 | 1 | 2 | 1 | 2 | 1 | 2 | 1 | 2 | 1 | 2 | 1 |
|---|---|---|---|---|---|---|---|---|---|---|---|---|
| 2 | 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 | 1 |
| 2 | 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 | 1 |
| 2 | 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 | 1 |
| 2 | 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 | 1 |
| 2 | 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 | 1 |
| 2 | 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 | 1 |
| 2 | 1 | 2 | 1 | 2 | 1 | 2 | 1 | 2 | 1 | 2 | 1 | 2 |
| 1 | 2 | 1 | 2 | 1 | 2 | 1 | 2 | 1 | 2 | 1 | 2 | 1 |

COMPARAISON OF AN AMOUNT OF CALCULATION
NECESSARY TO TEMPLATE MATCHING

|  | NUMBER OF TIMES OF CALCULATION OF THE DIFFERENCE OF PIXELS |
|---|---|
| PRIOR ART A (ALL SEARCH METHOD) | 278784 |
| PRIOR ART B (MULTISTEP SEARCH METHOD) | 20800 |
| EMBODIMENT (PRESENT INVENTION + MULTISTEP SEARCH METHOD) | 20928 |

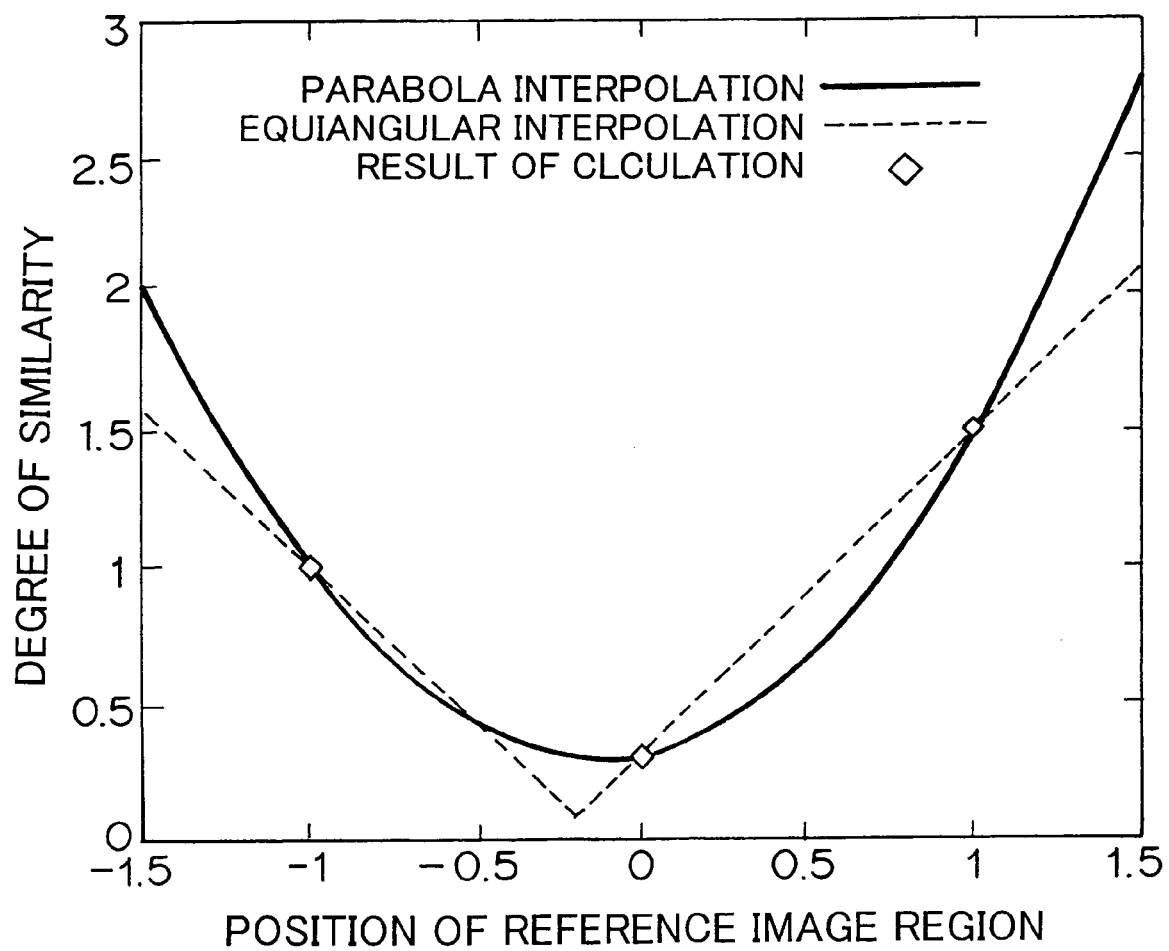

TEMPLATE MATCHING METHOD, TEMPLATE MATCHING APPARATUS, AND RECORDING MEDIUM THAT RECORDS PROGRAM FOR IT

TECHNICAL FIELD

The present invention relates to a template matching method of and a template matching apparatus for detecting the position of an image region similar to a template image region from on a reference image.

BACKGROUND ART

Template matching is a processing for detecting an image region having highest correlation to a template image region from on a reference image. The template matching is used in processings for searching a similar image, tracking an object, detecting motion vector in motion picture coding, and the like.

Non-patent document 1 describes conventional template matching technologies in detail in a chapter 6.

1. A method of defining a degree of similarity showing the difference between a partial region (reference image region) on a reference image nominated as a matching candidate and a template image and finding a reference image region for minimizing the degree of similarity is ordinarily used as a template matching method. Used as the degree of similarity is, for example, the average value of the signal value differences of the respective pixels between a reference image region and a template image (MAD: Mean Absolute Difference), the average value of the squares of signal value differences (MSE: Mean Square Error), and the like.

As a basic method of the template matching, a method of calculating degrees of similarity to all the candidates and detecting a reference image region for minimizing them is called an all search method. Although the all search method can detect the reference image region that minimizes the degree of similarity without error, it is very ineffective from a view point of an amount of calculation.

A method called a multistep search method or a rough/fine search method is widely used as a conventional technology for reducing the amount of calculation of the template matching. This is a method of dividing a template matching processing to plural steps. According to the method, at a first step, image regions are widely and roughly searched by evaluating the positions of reference image regions nominated as similar region candidates after the positions of them are thinned out at rough intervals, and, in the matching at second and subsequent steps, the similar region candidates are narrowed down stepwise by narrowly and finely searching only the peripheries of the image regions selected in the previous step.

FIG. 2 is a schematic view showing an example of the multistep search method. A lattice pattern in the figure shows the coordinates of a reference image region nominated as a matching candidate. In the example, a template matching processing is executed at two steps. At a first step, the degrees of similarity of the reference image regions labeled by 1 in FIG. 2 are calculated, and the image region that minimizes an evaluated value is selected as a similar image region. In FIG. 2, when it is assumed that the reference image region surrounded by a circle and shown by 1 is selected, at a next second step, the degrees of similarity of the reference image regions labeled by 2 in FIG. 2 are calculated, and the reference image region that minimizes a degree of similarity in the reference image regions surrounded by a circle and labeled by 1 and 2 is selected as a similar image region.

In the example, since 15×15=225 pieces of reference image regions are listed as matching candidates, when a matching processing is executed by the all search method, it requires to calculate the degree of similarity 225 times. The number of times of calculation can be reduced to 7×7=49 times at first step and to 8 times at a second step, that is, to 57 times in total by using the multistep search method.

Note that there is practically used a method of using a reference image reduced to low resolution at a previous step and a template image to further reduce the amount of calculation of the multistep search method. For example, at a first step of the example of FIG. 1, when the degree of similarity is calculated using an image having resolution reduced to ½ both horizontally and vertically, since the amount of calculation for calculating the degree of similarity once is reduced to about ¼, the amount of calculation can be more reduced than a simple multistep search method.

However, the multistep search method assumes such a property that the degree of similarity smoothly changes with respect to the positions of the reference image regions as a precondition for accurately executing matching. Accordingly, when an image having many fine pictures and edges and an image including many noises are input, the precondition is not established, and thus an image region whose degree of similarity is not small may be detected in the matching at a first step.

FIG. 3 shows an example of erroneous detection. A graph shows the degree of similarity that can be obtained from a template image and a reference image. Two minimal points exist in the example, and the right minimal point of them corresponds to the most similar reference image region as a correct answer. It is assumed that the left minimal point is a local minimum point less similar than the right one. When the multistep search method is applied to the example and the calculation of the degree of similarity at a first matching step is limited only to the positions shown by the large black circles in a broken line, the left minimal point, which is only a local minimum point, is erroneously detected.

The erroneous detection is liable to occur when two or more minimal points of the degree of similarity exist, and the calculation of the degree of similarity that takes a minimum point is thinned out. In particular, when a degree of similarity containing the sum of the differences of respective pixels is used as in MAD, since the degree of similarity is increased even if it is slightly dislocated from a minimal point, an erroneous detection ratio is increased.

An essential countermeasure for preventing the erroneous detection is to reduce the intervals of reference image regions whose degree of similarity is calculated at a first step or to select plural matching image regions at a first step and to execute matching in the peripheries of the plural image regions at a second step. However, since the number of times of calculation of the degree of similarity is increased, this countermeasure is not practical from the view point of the amount of calculation.

As a method of improving the accuracy of matching at a first step without increasing the number of times of calculation of the degree of similarity, there is contemplated a method of interpolatingly estimating the degrees of similarity of the positions located among the positions, which are located at rough intervals and the degrees of similarity of which are calculated, from the calculated degrees of similarity. For example, the parametric template method of the non-patent document 2 improves detection accuracy at a first step by interpolating a correlation coefficient by expressing it by a quadratic continuous function. However, the method has a restriction in that the degree of similarity is limited to the correlation coefficient. Further, a problem may arise in a load of a matrix calculation necessary to the interpolation.

It is also contemplated to make use of degree of similarity interpolation methods called equiangular fitting and parabola fitting, which are known as a degree of similarity interpolation method at a first step of the multistep search method. In the equiangular interpolation and the parabola interpolation, the degree of similarity calculated among three points is continuously interpolated by applying a broken line or a parabola that is symmetrical about a minimal point to the calculated degree of similarity (FIG. 14). These methods are used in a problem called subpixel estimation for estimating a position with accuracy higher than the resolution of an input image, and the subpixel estimation is used to improve the accuracy of a position of a similar image after the position is found once with integer pixel accuracy (non-patent document 3). However, in a status in which erroneous detection occurs in a multistep search, the intervals at which a degree of similarity is calculated are insufficient as compared with the fineness of a template image, many noises are included, or the degree of similarity is not symmetrical at a minimal point in many cases.

Accordingly, there is required a degree of similarity estimation method in which a local minimal solution does not fall even in the above cases.

Non-patent Document 1: A Murat Tekalp, "Digital Video Processing" Prentice Hall PTR, 1995

Non-patent document 2: K. Tanaka, M. Sano, S. Ohara, M. Okudara, "A parametic template method and its application to robust matching," in Proc. of IEEE Conference on Computer Vision and Pattern Recognition, 2000.

Non-patent document 3: Masao Shimizu and Masatoshi Okutomi, "Significance and Attributes of Sub-Pixel Estimation on Area-Based Matching", Systems and Computers in Japan, Vol. 34, No. 12, pp. 1-10, November 2003.

DISCLOSURE OF THE INVENTION

As described above, the template matching executed by the all search method requires a large amount of the degree of similarity calculation. When the multistep search method is used, it is possible to more reduce the amount of calculation than the all search method. However, the multistep search method is defective in that an erroneous image region is detected to an image including many fine pictures and edges and to an image containing many noises in a first step matching. It cannot be said that the degree of similarity interpolation method for preventing the erroneous detection has sufficient accuracy.

Accordingly, an object of the present invention is to provide a template matching method having high detection accuracy with a small amount of calculation and an apparatus of it. In particular, it is an object of the present invention to provide a template matching method and an apparatus of it which reduce an error detection probability by accurately assuming a degree of similarity at a position where calculation is not executed even if an amount of calculation is reduced by roughly setting the position intervals in a degree of similarity calculation.

According to the present invention, there is provided a template matching method of detecting the position of an image region similar to a template image region from on a reference image which is characterized by comprising calculating the degree of similarity of the image region to the template image region at rough position intervals, estimating the degree of similarity at a position where it is not calculated from the calculated degree of similarity making use of the gradients of a degree of similarity found independently in a plurality of directions, and determining the position having a small calculated or estimated value of the degree of similarity as the position of the similar image region.

In the template matching method, the degree of similarity may be estimated making use of the degree of similarity estimated up to that time in addition to the calculated degree of similarity in the estimation of the degree of similarity.

According to the present invention, there is provided a template matching method of narrowing down the position of a similar image region stepwise based on a multistep search method which is characterized by detecting the position of the similar image region by the template matching method before the final step of it.

In the template matching method, the value region of the degree of similarity estimated value may be restricted such that the difference between the degree of similarity estimated value and the degree of similarity of a periphery used for the estimation or the gradient of the degree of similarity does not exceed a threshold value.

In the template matching method, the threshold value may be determined based on an image region, which is obtained by moving the template image region in the same direction as or in the opposite direction to an estimated direction vector obtained by subtracting the position of the nearby image region from the position where the degree of similarity is estimated, and on the magnitude of the degree of similarity calculated from the template image.

The template matching method may be characterized in that, when five reference image regions A, B, C, D, E are sequentially located on a straight line, the degree of similarity at the position C is estimated from an interpolation value externally inserted assuming gradient continuity from the degrees of similarity in the image regions A, B and from an interpolation value externally inserted assuming gradient continuity from the degrees of similarity in the image regions D, E in the estimation of the degree of similarity.

EFFECT OF THE INVENTION

The present invention has an effect of providing a template matching method having a small amount of calculation and high detection accuracy.

BRIEF DESCRIPTION OF THE DRAWINGS

FIG. 2 is a schematic view explaining a template matching method based on a conventional multistep search method.

FIG. 5 is a schematic view showing an example of a method of classifying a reference image region in an embodiment of the present invention.

FIG. 10 is a schematic view showing a method of classifying a reference image region in the embodiment of the present invention.

FIG. 12 is a table showing comparison of the amount of calculation of a conventional example with that of the embodiment of the present invention.

FIG. 14 is a view showing an example of equiangular interpolation and parabola interpolation.

Figure 1:
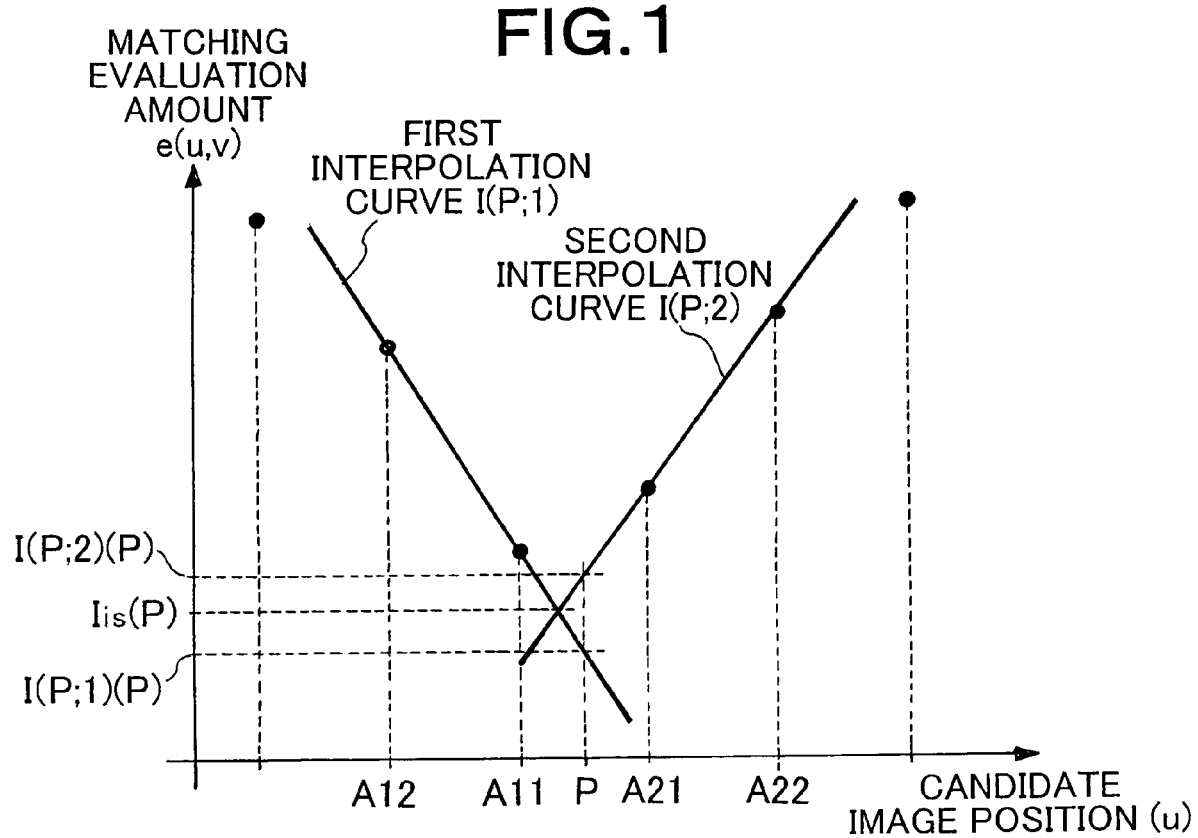
FIG. 1 is a schematic view explaining a degree of similarity estimation method of the present invention.

DESCRIPTION OF REFERENCE NUMERALS 601 storage of reference image
602 storage of template image
603 calculation of degree of similarity
604 detection of degree of similarity minimizing candidate
605 determination of rounded threshold value
606 estimation of degree of similarity
607 degree of similarity storage variable

BEST MODE FOR CARRYING OUT THE INVENTION

A best mode for executing the present invention will be described below in detail with reference to the drawings.

Embodiment 1

Figure 4:
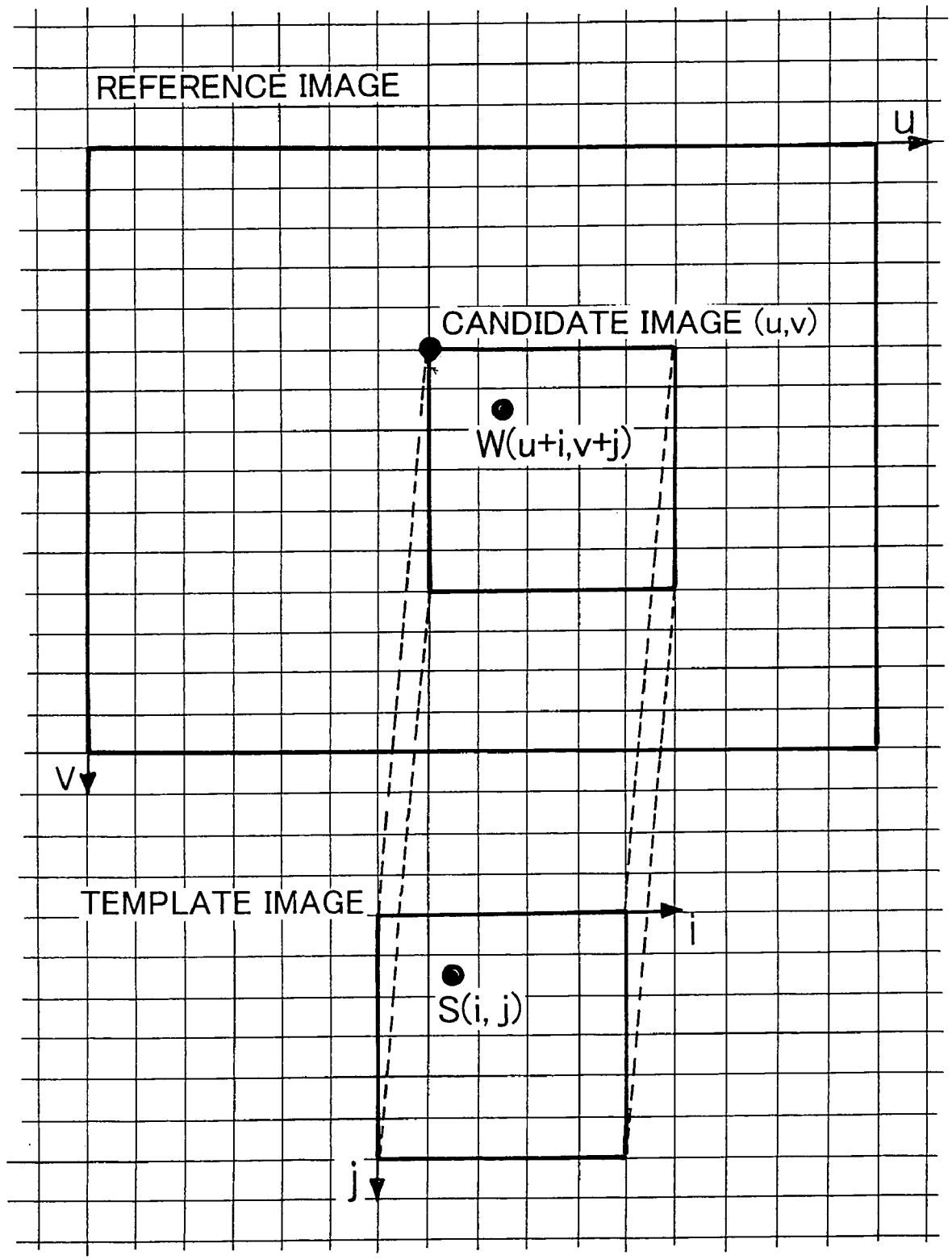
FIG. 4 is a schematic view showing the relation among a template image, a reference image, and a reference image region.

A first embodiment of the present invention will be explained below. FIG. 4 shows the relation among a function, a variable, and a coordinate used for explanation. $S(i, j)$ shows a template image, and $W(i, j)$ shows a reference image. $(i, j)$ are a coordinate in an image and take integers in the embodiment. The position of a reference image region nominated as a matching candidate is shown by coordinates $(u, v)$ in a reference image $W(i, j)$. In the embodiment, $(u, v)$ take integers.

[Matching Evaluation Basis]

The degree of similarity between the template image and the reference image region $(u, v)$ is shown by $e(u, v)$. It is assumed that smaller $e(u, v)$ shows that the reference image region $(u, v)$ is more similar to the template image. Template matching in the embodiment is a processing for detecting a reference image region $(u, v)$ having small $e(u, v)$.

$e_{MAD}(u, v)$ shown in an equation 1 is a specific example of the degree of similarity $e(u, v)$. $e_{MAD}(u, v)$ is an mount showing the distance between two image regions by a difference absolute value average of pixel signals and called MAD (Mean Absolute Difference). In the equation 1, a group R shows the group of pixels that takes an average, and |R| shows the number of elements of the group R.

$$e_{MAD}(u, v) = \frac{1}{|R|} \sum_{(i,j) \in R} |S(i, j) - W(u+i, v+j)|$$ [Equation 1]

[Outline of Matching Processing]

In general, since the calculation of $e(u, v)$ requires a calculation of a difference as many times as the number of pixels included in R, an amount of calculation is increased when the calculation is repeated many times. Thus, in the present invention, the amount of calculation of the matching processing is reduced by calculating the degree of similarity $e(u, v)$ only to a part of reference image regions given as matching candidates. Instead of it, the position, where the calculation of the degree of similarity is omitted, the degree of the similarity is estimated by interpolating it from the calculated degree of similarity to prevent the drop of detection accuracy.

For the purpose of explanation, a result that the degree of similarity of the reference image region $(u, v)$ is estimated from the degree of similarity of a periphery is shown by estimate_e$(u, v)$. The degree of similarity $e(u, v)$ obtained as a result of calculation or as a result of estimation is shown by calc_e$(u, v)$.

A group of the reference image regions $(u, v)$ from which the degree of similarity is actually calculated is shown by G(1). The reference image regions $(u, v)$, which are estimated without calculating a degree of similarity, are classified to (K−1) pieces of groups G(2), G(3), . . . , G(K) numbered in the order in which an estimation processing is executed. At the time, it assumed that the degrees of similarity of the reference image regions $(u, v)$ that belong to the same group are estimated by the same method.

Although there are various methods of selecting the candidates G(1) whose degrees of similarity are to be calculated, it is preferable to select them by thinning out them so that the reference image regions in a search range can be entirely covered at a rough density likewise the first matching step of the multistep search method. It is preferable to classify candidates whose degrees of similarity are to be estimated to G(2), G(3), . . . , G(K) from the relative positional relation of them to the image regions that belong to (G1).

Parts (a), (b), (c) of FIG. 5 are views exemplifying a method of classifying the matching candidates to G(1), (G2), . . . G(K). In the figure, it is assumed that a lattice pattern shows the coordinates $(u, v)$ of a reference image region and that one lattice box corresponds to one coordinate pixel. It is assumed that the reference image regions $(u, v)$ labeled by 1 belong to (G1) and that the reference image regions $(u, v)$ labeled by 2, 3, 4 belong to G(2), G(3), G(4). The image regions that correspond to the boxes to which no numeral is labeled are removed from the matching candidates.

In the example of the part (a) of FIG. 5, the regions labeled by "1" are disposed vertically and laterally at two pixel intervals. The degree of similarity is calculated to these "1s". Next, the degree of similarity of "2s" sandwiched laterally between "1" and "1" is estimated, the degree of similarity of "3s" sandwiched vertically between "1" and "1" is estimated, and finally the degree of similarity of "4s" is estimated. In the examples of the parts (b) and (c) of FIG. 5, the regions labeled by "1" are disposed laterally at two pixel intervals. First, the degree of similarity of "1s" is calculated, and then the degree of similarity of the remaining candidates labeled by "2s" is estimated.

Figure 6:
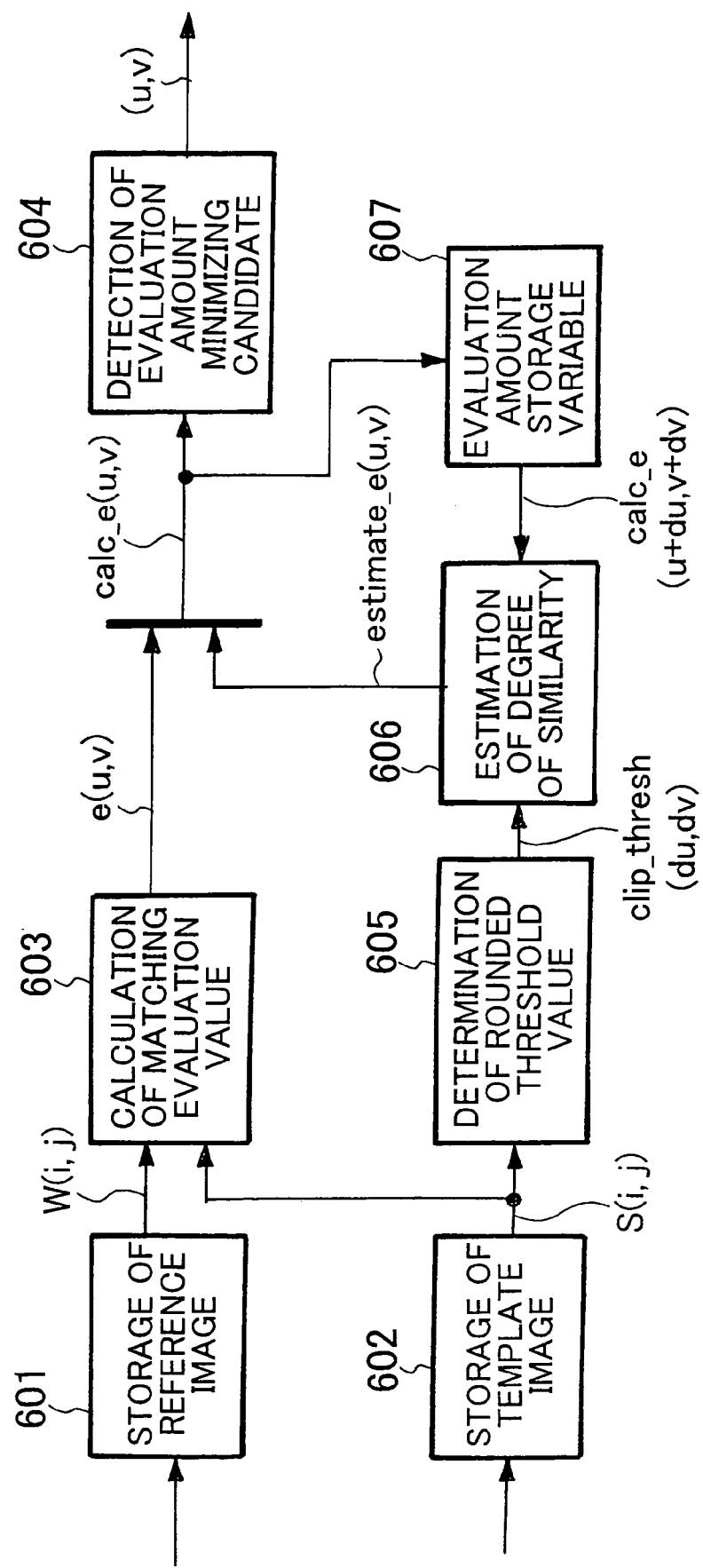
FIG. 6 is a block diagram showing an arrangement of the embodiment of the present invention.

FIG. 6 is a block diagram showing a template matching method in a first embodiment. A reference image $W(i, j)$ and template data $S(i, j)$ are input to image memories 601 and 602 from the outside. 603 calculates the degrees of similarity $e(u, v)$ of the matching candidates $(u, v)$ belonging to G(1) and stores an obtained result in an array memory 607 as calc_e$(u, v)$. 605 calculates a threshold value clip_thresh$(du, dv)$ for interpolation and rounding from the template image $S(i, j)$ and supplies a result to 606. 606 estimates the degrees of similarity of (u, v) belonging to G(2), . . . G(K) from the degree of similarity calc_e(u, v) stored in 607 and the rounding threshold value calculated in 605 and stores a result estimate_e(u, v) as calc_e(u, v). 605 calc_e(u, v) output by 603 and 606 is also output to 604 which outputs a candidate (u*, v*) that minimizes calc_e(u, v) to the outside as a result of detection of the template matching.

Figure 7:
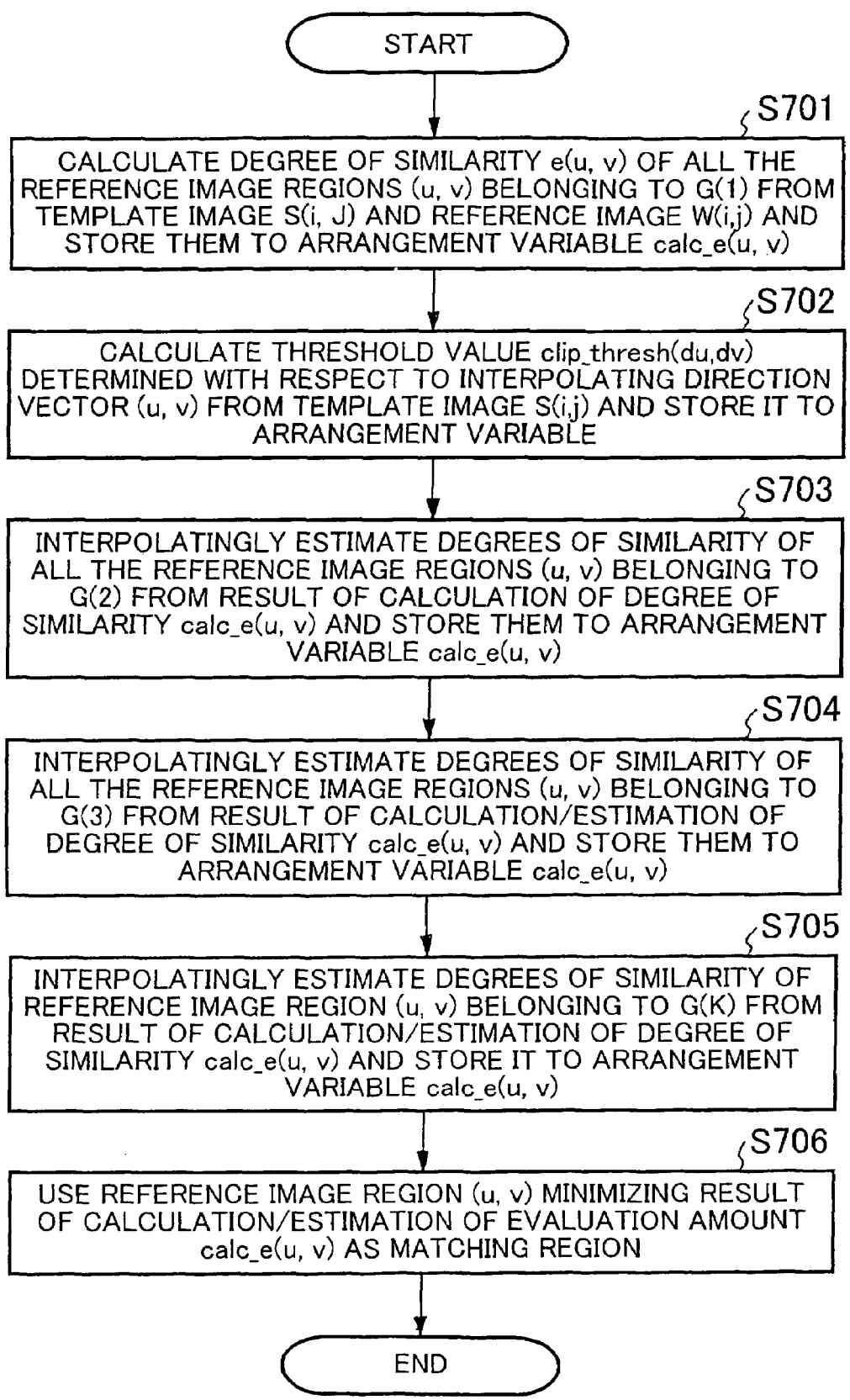
FIG. 7 is a sequence view showing a processing procedure of the embodiment of the present invention.

FIG. 7 shows a flow of a template matching processing in the first embodiment. At S701, the degrees of similarity e(u, v) of the reference image regions (u, v) belonging to the group G(1) of the reference images are calculated, and a result calc_e(u, v) is stored. (u, v) for minimizing calc_e(u, v) is also detected at the same time. Next, at S702, a rounded threshold value clip_thresh(du, dv) used for the interpolation and estimation of the degree of similarity is calculated, and a result is stored to a variable. At S703 to S705, the degrees of similarity of (u, v) belonging to G(1), G(2), . . . G(K) are sequentially estimated, and a result of estimation estimate_e(u, v) is stored as calc_e(u, v). At the same time, (u, v) that minimizes calc_e (u, v) is also detected, and, at S706, finally obtained (u, v) is output as a result of matching.

[Estimation of Degree of Similarity]

Figure 3:
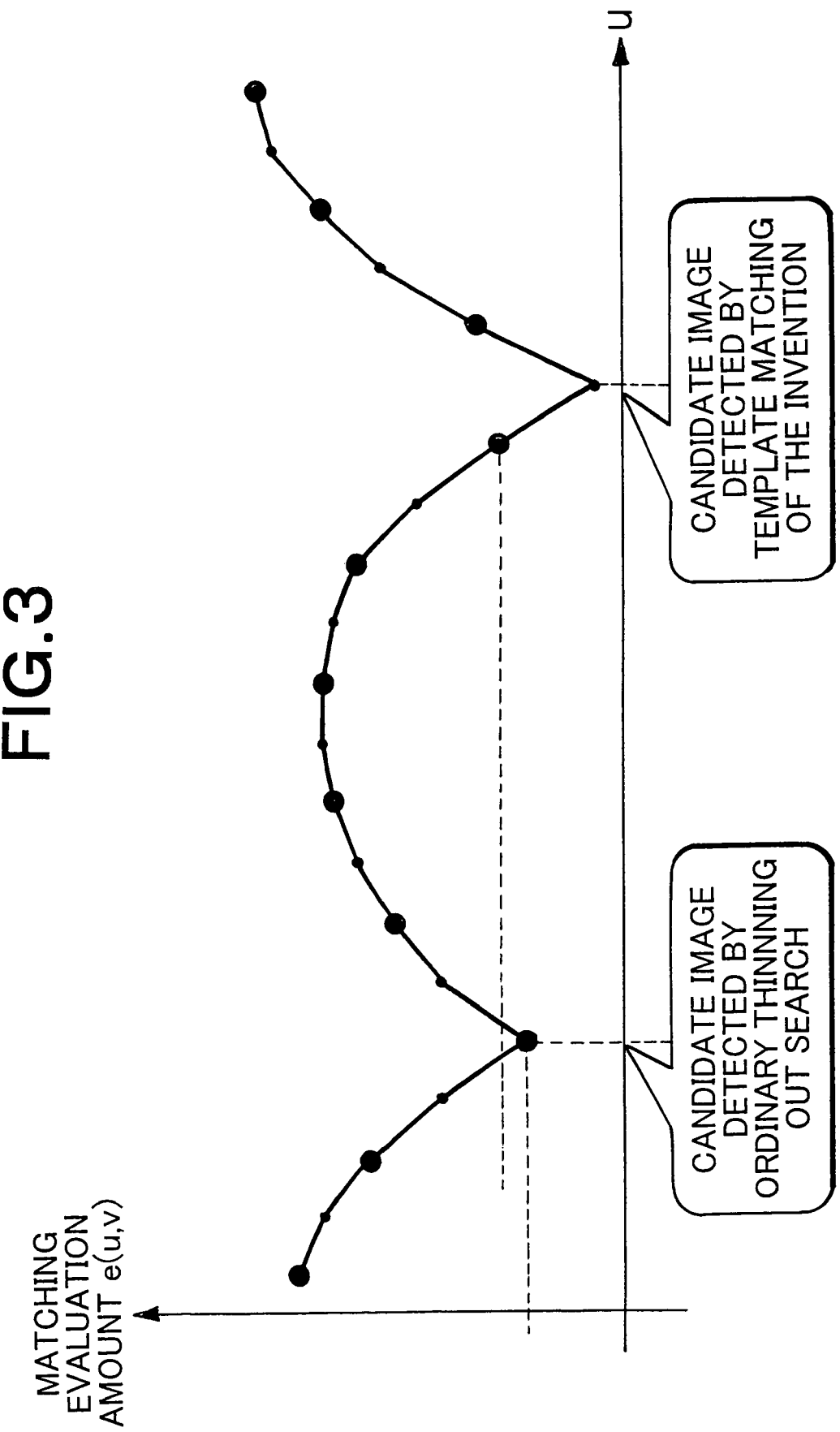
FIG. 3 is a schematic view showing a problem of the conventional multistep search method and an effect of the present invention.

A degree of similarity estimation method will be explained. It is necessary to accurately estimate a degree of similarity without causing an error even if minimum values locally exist in the degree of similarity calculated from a template image and a reference image as shown in FIG. 3 as well as even if calculation of the degree of similarity in a most similar image is thinned out. At the time, a problem arises in that the degree of similarity abruptly changes in the vicinity of a minimal point. Since the degree of similarity has a different gradient on right and left sides when viewed from the minimal point, it is difficult to effectively execute estimation by an interpolation method that assumes smoothness of a curved line such as linear interpolation, spline interpolation, and the like.

Accordingly, the present invention avoids a problem of gradient discontinuity at a minimal point by separately executing interpolation from the degree of similarity of an image region located in a different direction when viewed from a point to be estimated. More specifically, the present invention increases detection accuracy by estimating the degree of similarity in two steps of a procedure for externally inserting an interpolation value or an interpolation curve making use the gradients of the degree of similarity independently found from plural directions and a procedure of determining a finally estimated value by combining plural results of interpolation obtained. Here, the plural directions indicate one direction of left and right direction, one direction of up and down directions, and the like. It is not assumed that a gradient is symmetrical on a left side and a right side. An interpolation processing in the respective directions is executed by an ordinary method of the linear interpolation, the spline interpolation, and the like assuming that the gradient of the degree of similarity smoothly changes.

For example, in FIG. 3, as to the degrees of similarity of the points without large black circle, interpolation curves are separately found from the degrees of similarity of the black points located on the left side and on the right side when viewed from the respective points, and the intersecting point of the thus obtained two interpolation curves is used as an degree of similarity estimated value. With this operation, the degree of similarity estimated value of the right side minimal point is smaller than that of the left side minimal point, thereby erroneous detection due to thinning out of the degree of similarity calculation can be prevented.

The procedure of the degree of similarity estimation will be explained below in detail. In the present invention, the estimated value estimate_e(u, v) of the degree of similarity e(u, v) in the reference image region (u, v) is determined by the two steps of procedures, that is, a procedure of finding M pieces (M≧2) of a degree of similarity interpolation curve in the vicinity of (u, v) or an interpolation value I(u, v; m) in (u, v) and a procedure of finding an estimated value estimate_e (u, v) from the obtained interpolation curve or interpolation value I(u, v; m). Here, m is an identification number attached to the interpolation curve or the interpolation value. It is assumed that the interpolation value used to create the respective interpolation values I (u, v; m) (m≦M) is the interpolation value of the reference image region located in a different direction when viewed from (u, v).

Figure 8:
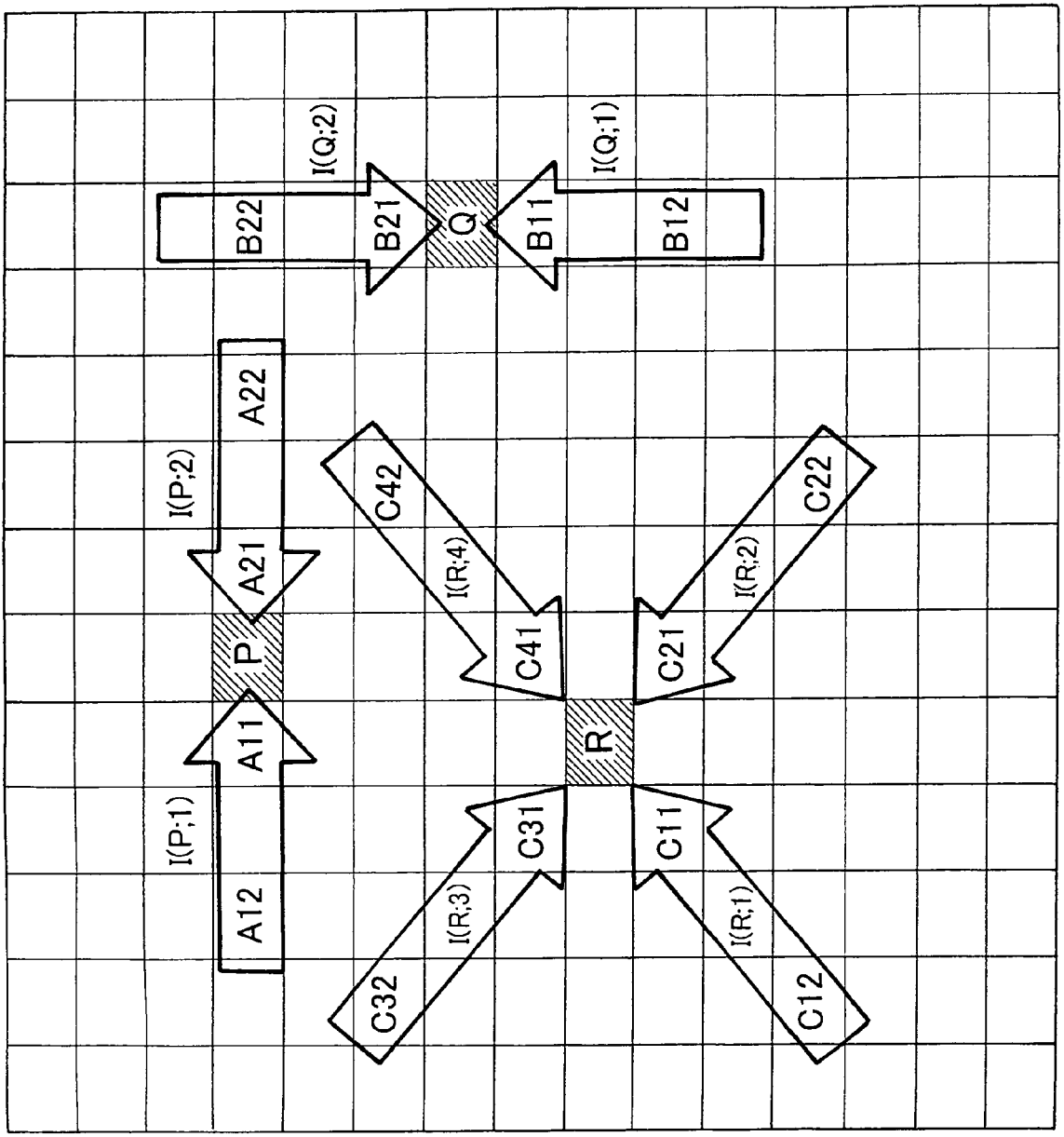
FIG. 8 is a schematic view showing the positions of reference image regions used for degree of similarity interpolation in the embodiment of the present invention.

FIG. 8 shows a specific example. In the figure, one lattice box corresponds to one pixel. Here, as to the degree of similarity estimated value estimate_e(P) of a reference image region P, first, I(P; 1) is found from the degrees of similarity calc_e(A11), calc_e(A12) of reference image regions A11, A12, then I(P; 2) is found from calc_e(A21), calc_e(A22), and finally the estimated value estimate_e(P) of e(P) is determined from I(P; 1) and I(P; 2). Here, attention must be paid to that when A11, A12 and A21, A22 are viewed from P, the directions where they are located are reversed between A11, A12 and A21, A22.

The degree of similarity estimation of a reference image region Q is the same as that of P. I(Q; 1) is calculated from the degrees of similarity of reference image regions B11, B12, and then I(Q; 2) is calculated from the degrees of similarity of B21, B22 located in a direction different from B11, B12. Finally, estimate_e(Q) is determined from I(Q; 1) and I(Q; 2).

The degree of similarity estimation of a reference image region R is an example of calculation of four interpolation values. Eight points locating in the periphery of R is divided into 4 sets according to directions, and the degree of similarity of R is interpolated from respective two degrees of similarity. Specifically, I(R; 1) is interpolated from the degrees of similarity of C11, C12, I(R; 2) is interpolated from the degrees of similarity of C21, C22, I(R; 3) is interpolated from the degrees of similarity of C31, C32, and I(R; 4) is interpolated from the degrees of similarity of C41, C42. A final estimated value estimate_e(R) is determined from the four interpolation values I(R; 1), I(R; 2), I(R; 3), I(R; 4) found as described above.

The respective interpolation curves or interpolation values I (u, v; m) to the degree of similarity of (u, v) are calculated assuming that the degree of similarity e(u, vm) has a continuously and gradually changing gradient in a region in which (u, v) and a reference image region used for interpolation exist. An ordinarily known method of interpolating a continuous function such as a linear interpolation, a spline interpolation, and the like is used as an interpolation method.

FIG. 1 is a graph showing an example of a method of interpolating and estimating the degree of similarity of the reference image region P from the degrees of similarity A11, A12, A21, A22. In the graph, the lateral axis shows the coordinate u of the reference image region, and the vertical axis shows a degree of similarity. Black circles show a calculated degree of similarity calc_e(u, v). I(P; 1) is a curved line linearly interpolated from A11, A12, and I(P; 2) is a curved line found from A21, A22 by the linear interpolation. I(P; 1; P) and I(P; 2; P) show values taken by an interpolation curve at P, and Iis(P) shows the degree of similarity on the intersecting point of two curves.

As a specific example, when A12, A11, A21, A22 are disposed at equal intervals as well as P is located at the center between A1 and A22, I(P; 1; P) and I(P; 2; P) are as shown in equations 2, 3, 4. In the equation 4, (e2−e1) is the gradient of the degree of similarity found from A12 and A11. An interpolation value from a left side in P is determined by multiplying (e2−e1) by a ratio 1/2 of the distance between P−A11 and the distance between A11−A12 and subtracting a resultant value from e1. When positional intervals are different, the coefficient of the equation 4 is changed according to the distance ratios among P, A11, A12.

$$I(P; 1; P) = f_1(\text{calc\_e}(A11), \text{calc\_e}(A12)) \quad \text{[Equation 2]}$$

$$I(P; 2; P) = f_1(\text{calc\_e}(A21), \text{calc\_e}(A22)) \quad \text{[Equation 3]}$$

$$f_1(e_1, e_2) = e_1 - \frac{e_2 - e_1}{2} \quad \text{[Equation 4]}$$

The degree of similarity estimated value of P is determined from the values taken by the interpolation curves I(P; 1) and I(P; 2) in the vicinity of P. Although the determination can be made by various methods, one method is to use, for example, the maximum value Imax(P), the minimum value Imin(P), and the average value Iava(P) of I(P; 1; P) and I(P; 2; P) as an estimated amount. Otherwise, it is also one method to express the estimated value by the linear sum Imix(P) of Imax(P) and Imin(P). They will be shown by an equation 5 to an equation 8.

$$I_{\max}(P) = \max\{I(P; 1)(P), I(P; 2)(P)\} \quad \text{[Equation 5]}$$

$$I_{\min}(P) = \min\{I(P; 1)(P), I(P; 2)(P)\} \quad \text{[Equation 6]}$$

$$I_{ave}(P) = \frac{I_{\max}(P) + I_{\min}(P)}{2} \quad \text{[Equation 7]}$$

$$I_{mix}(P; \theta) = (1 - \theta)I_{\max}(P) + \theta I_{\min}(P) \quad \text{[Equation 8]}$$

It is also one example to use the degree of similarity $I_{IS}(P)$ at the intersecting point of two curved lines interpolated to P in place of the interpolation value in P. As a specific example, when A12, A11, A21, A22 are located at the equal intervals, the estimated values shown by equations 9, 10 are given by calculating the intersecting point of linear lines linearly interpolated from the left and right sides.

[Equation 9]

If there is a intersecting point between A11 and A12:

$$I_{is}(P) = f_2(\text{calc\_e}(A11),$$
$$\text{calc\_e}(A12), \text{calc\_e}(A21), \text{calc\_e}(A12))$$

If there isn't a interesting point between A11 and A12:

$$I_{is}(P) = \frac{\text{calc\_e}(A11) + \text{calc\_e}(A21)}{2}$$

$$f_2(a, b, c, d) = \frac{3ac + bd - 2ad - 2bc}{a + c - b - d} \quad \text{[Equation 10]}$$

As a method of determining an estimated value from 4 interpolation curves I(R; 1), I(R; 2), I(R; 3), I(R; 4) as in R of FIG. 8, there is a method of rearranging values I(R; 1) (p), I(R; 2)(p), I(R; 3)(p), I(R; 4)(p) in P of the four interpolation curves in the order of larger values and making them to Isort(R; 1), Isort(R; 2), Isort(R; 3), Isort(R; 4), and expressing these four values by Imix (R) in which these four values are mixed by a linear sum at a ratio of (1−θ1−θ2−θ3):θ1:θ2:θ3 (equation 11).

$$I_{mix}(R; \theta_1, \theta_2, \theta_3) = (1 - \theta_1 - \theta_2 - \theta_3)I_{sort}(R; 1) + \quad \text{[Equation 11]}$$
$$\theta_2 I_{sort}(R; 2) + \theta_3 I_{sort}(R; 3) + \theta_4 I_{sort}(R; 4)$$

Even in an example in which interpolation is difficult because the degree of similarity has plural minimal values as shown in FIG. 3 and a gradient greatly changes in the vicinities of minimal points, it is possible to estimate a degree of similarity near to an actual value by estimating the degree of similarity as described above. As a result, it is possible to reduce an error detection probability.

[Rounding of Interpolation Estimated Value for Preventing Erroneous Detection]

When an estimation processing is executed from a degree of similarity calculated using an image including noise, an error detection probability may be increased. For example, in the example of FIG. 1, when the difference between the degrees of similarity of A12 and A11 is increased by the effect of noise at the time P does not exist in the reference image region in which the degree of similarity is minimized, the degree of similarity of P is estimated smaller than an actual value. As a result, a probability of erroneously detecting that P is in an matching region is increased. This phenomenon is particularly a problem in a smooth image whose degree of similarity less changes. Thus, to prevent an erroneous estimation due to mixture of noise, an extremely small interpolation value is avoided by restricting the gradient of an interpolation curve.

Specifically, the gradient of an m-th interpolation curve I(P; m) in the reference image region P is restricted to a given value or less, and I'(P; m) of an equation 12 is used for the interpolation of a degree of similarity. In the equation 12, I(P; m; Q) shows an interpolation value in the reference image region Q located in the vicinity of P. $A_{m1}$ shows a nearby reference image region used for interpolation, and $\|Q-A\|$ shows the distance between Q and A. clip_thresh (P, $A_{m1}$) shows the upper limit of the difference between $e(A_{m1})$ and estimate_e(P), and the upper limit of the gradient magnetic field is obtained by dividing clip_thresh (P, $A_{m1}$) by the distance $\|Q-A_{m1}\|$ between P and $A_{m1}$.

$$I'(P; m; Q) = \max\left\{\begin{array}{l} I(P; m; Q), e(A_{m1}) \\ -\|Q - A_{m1}\| \times \frac{\text{clip\_thresh}(P, A_{m1})}{\|P - A_{m1}\|} \end{array}\right\} \quad \text{[Equation 12]}$$

A similar effect can be also obtained even by employing a method of rounding a finally estimated value estimate_e(P) to stabilize matching in place of restricting a gradient every plural pieces of interpolation curves. In an equation 13, estimate_e'(P) specifically shows it. In the equation 13, M shows the number of the interpolation curves.

estimate_e(P)=max{estimate_e(P), e($A_{11}$)−clip_thresh(P,$A_{11}$),

. . . , e($A_{M1}$)−clip_thresh(P,$A_{M1}$)}      [Equation 13]

Although the rounded threshold value clip_thresh (P, A) may be set to a fixed value, its optimum value is different depending on the characteristics of an input image. In the embodiment, the rounded threshold value is determined based on the following study.

lip_thresh(P, A) shows the maximum value of the difference between e(A) and e(P). Since an object of estimating the degree of similarity of the image region P is to check whether or not P is similar to the template image, it is contemplated that matching can be stabilized by setting the difference between e(A) and c(P) that can be taken when the image region P is similar to the template image.

Figure 9:
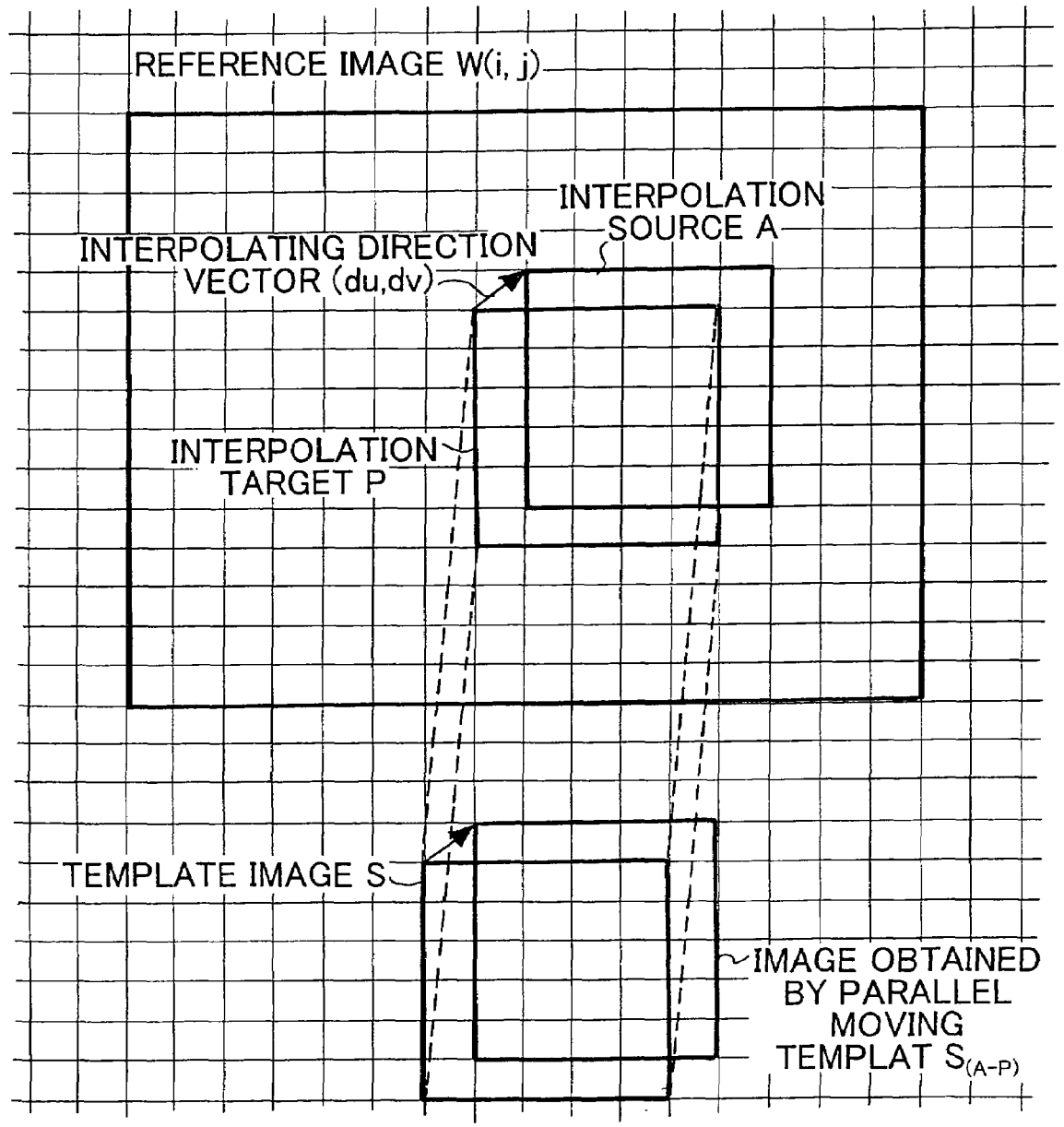
FIG. 9 is a schematic view explaining meaning of rounded threshold value calculation in the embodiment of the present invention.

An amount for evaluating matching between the image region P, which has the same shape as the template image region, and the image region Q is defined by expanding the definition of the degree of similarity e(P) and set to e(P, Q). (Note: since this is defined to show the idea of the present invention, e (P, Q) may not be actually defined.) FIG. 9 shows the relation between the regions A, P on the reference image and the template image S.

Since e(P, Q) can be regarded as the distance between the image regions, the relation of an equation 14 is established by a trigonometric inequality. The equation 14 can be modified to an equation 15 in view of that e(S, P), e(S, A) have the same degree of similarity. Here, when a situation that the image region P is matched to the template image is assumed, the distance e(P, A) between P and A can be approximated by the distance e(S, $S_{(A-P)}$) between the template image S and an image $S_{(A-P)}$ obtained by dislocating the template image S in an interpolating direction (P→A). An equation 16 shows that e(S, T) approximately gives the upper limit of the difference between e(A) and e(P).

$$e(S,P)+e(P,A) \geq e(S,A) \quad \text{[Equation 14]}$$

$$e(A)-e(P) \leq e(P,A) \quad \text{[Equation 15]}$$

$$e(A)-e(P) \leq e(P,A) \approx e(S,T) \quad \text{[Equation 16]}$$

Accordingly, in the embodiment, the rounded threshold value clip_thresh (P, A) used to interpolate the degree of similarity in the image region P from A is determined based on the template image, which is moved in the same direction as or the opposite direction to the difference vector (du, dv) obtained by subtracting P from A, and on the degree of similarity calculated from the template image.

In the interpolation of P of FIG. 8, a threshold value is determined as shown in, for example, an equation 17. $\lambda 0$, $\lambda 1$ (>0) are adjustment parameters. When pixels can be only partly obtained in a region T in which the template image is subjected to parallel movement, the pixels are corrected by a method of finding e(S, T) from a part of the pixels that can be calculated and multiplying the value by a given value, and the like. Note that the amount of dislocation of the template image from S to T need not be equal to (du, dv) as long as the dislocating direction is the same direction as or the opposite direction to (du, dv). In this case, the parameter $\lambda 1$ is adjusted according to the ratio of the distance between S and T and the distance between P and A. clip_thresh2 shown in an equation 18 is a specific example when $e_{MAD}$ shown in the equation 1 is used as a degree of similarity.

$$\text{clip\_thresh1}(P, A) = \max\{0, -\lambda_0 + \lambda_1 e(S, T)\} \quad \text{[Equation 17]}$$

$$\text{clip\_thresh2}(du, dv) = \max\left\{0, -\lambda_0 + \frac{\lambda_1}{|R|} \sum_{(i,j) \in E} |S(i+du, j+dv) - S(i, j)|\right\} \quad \text{[Equation 18]}$$

The rounded threshold value clip_thresh as described above is the function of the interpolating direction vector (du, dv) and the template image S(i j), and the reference image W(i,j) is not included in the equation. Accordingly, it is sufficient to calculate the rounded threshold value only once when template matching starts, and it is not necessary to recalculate it each time the position of the reference image region is changed.

[Summary]

As described above, the embodiment reduces the amount of calculation while minimizing the deterioration of detection accuracy by thinning out the calculation of the degree of similarity at rough position intervals and by estimating the degree of similarity of the position where it is not calculated by interpolating it from the degree of similarity to the reference image region in a periphery.

At the time, in view of the property that the gradient of the degree of similarity is greatly changed in the vicinity of a minimal point, the error detection probability is reduced by estimating the degree of similarity by the procedure of finding the interpolation curve or the interpolation value making use of the gradients, which can be found independently in the plural directions when viewed from an interpolation point, and determining the degree of similarity from the result of plural interpolations.

Further, the embodiment prevents the estimation error of the degree of similarity due to noise mixed to an input image by determining the rounded threshold value from the image obtained by dislocating the template image in the same direction as or the opposite direction to the interpolating direction and from the magnitude of the degree of similarity of the template image and by restricting the value range of the interpolation value or the estimated value of the degree of similarity so that it is not smaller than the value obtained by subtracting the threshold value from a nearby degree of similarity.

When the embodiment is used in the first matching step of the template matching based on the multistep search method, the embodiment can obtain a great effect while realizing both the reduction of the amount of calculation and detection accuracy. When, for example, the embodiment is compared with the multistep search method of calculating the degree of similarity of the reference image region belonging to G(1) of the part (a) of FIG. 5 in a first matching step, the erroneous detection probability can be reduced in the embodiment because it estimates the degrees of similarity of G(2), G(3), G(4). As compared with the conventional multistep search method, although the amount of calculation is increased to estimate the degree of similarity, the increase of it is negligible as compared with a load when the degree of similarity is accurately calculated from an image.

Embodiment 2

A second embodiment of the present invention will be explained. A template matching method in the second embodiment is not different from the first embodiment except that a reduced image is used to calculate a degree of similarity to reduce an amount of calculation and that the definition of the degree of similarity and a method of calculating a rounded threshold value is different as a result. Accordingly, only the difference between it and the first embodiment will be explained.

To simplify explanation, only a case that an image is reduced at a reduction ratio of 1/2 in both the vertical and lateral directions is assumed. Images created by reducing a template image S(i, j) and a reference image W(i, j) are shown by S2(i, j), W2(i, j). It is assumed that the pixels corresponding to a coordinate (i, j) after reduction correspond to a coordinate (2i, 2j) before reduction.

The degree of similarity between the template image and a reference image region (u, v) is shown by e(u, v) likewise the first embodiment. It is assumed that coordinates(u, v) are not coordinates on the reduced image and shows a coordinate value on the image before reduction. In the embodiment, the degree of similarity of the reference image region (u, v) is calculated from the reduced image S2(i, j), W2(i, j). $e_{MAD2}$ (2u, 2v) in an equation 19 is an example of e(u, v). Here, both u, v are even numbers, and a case that u or v is an odd number is not defined. It is assumed that a group R2 is a group of pixels for evaluating a difference in the reduced template image.

$$e_{MAD2}(u, v) = \frac{1}{|R_2|} \sum_{(i,j) \in R_2} \left| S_2(i, j) - W_2\left(\begin{array}{c} \frac{u}{2} + i, \\ \frac{v}{2} + j \end{array}\right) \right|$$ [Equation 19]

(u, v) for calculating a degree of similarity and (u, v) for interpolating a degree of similarity are classified according to the pattern shown in the part (a) of FIG. 5. One lattice box corresponds to one pixel in the image before reduction. As to (u, v) belonging to G(1), both u and v are even numbers, and thus eMAD2(u, v) of the equation 19 can be calculated. As to (u, v) to which G(2), G(3), G(4) belong, it is assumed that the value of the degree of similarity found according to an estimation procedure of the present invention is regarded as the degree of similarity e(u, v) in (u, v).

As an example of a degree of similarity estimation method of the embodiment, the embodiment executes estimation by the same method as the first embodiment except that the definition of the degree of similarity is different from the first embodiment. Further, as another example, a rounded threshold value clip_thresh(du, dv) may be calculated from the reduced template image S2(i, j). An example of it is shown by clip_thresh3 of an equation 20. Although clip_thresh3(du, dv) is calculated from the difference between the image obtained by dislocating the reduced template image by (du, dv) and the template image, since the amount of dislocation of (du, dv) in the reduced image is made twice in the image before reduction, a correction for multiplying the average of obtained differences by ½ is executed.

$$\text{clip\_thresh3}(du, dv) = \max\left\{0, -\lambda_0 + \frac{1}{2} \frac{\lambda_1}{|R_2|} \sum_{(i,j) \in R_2} |S_2(i+du, j+dv) - S_2(i, j)|\right\}$$ [Equation 20]

The template matching method of the second embodiment is executed by the same procedure as the first embodiment except the points described above.

Although an effect is the same as the first embodiment, an amount of calculation is smaller than the first embodiment because the reduced image is used. The embodiment is effective when it is used in a first matching step of the multistep template matching using a reduced image.

Embodiment 3

A third embodiment of the present invention will be explained by a method of showing a difference between it and the first embodiment.

A template matching method in the third embodiment estimates a matching image region with 0.5 pixel accuracy. Accordingly, the coordinates (u, v) of a reference image region take values of 0.5 pixel unit. It is assumed that a degree of similarity is, for example, eMAD(u, v) shown in the equation 1. The reference image W(i, j) must be referred to by the 0.5 pixel unit, which defines a pixel internally inserted by an appropriate method according to a purpose of use of template matching.

In the third embodiment, (u, v) for calculating a degree of similarity and (u, v) for interpolating a degree of similarity are classified according to the pattern shown in the part (a) of FIG. 5. However, different from the first embodiment, it is assumed that one lattice box corresponds to 0.5 pixel in place of one pixel and that (u, v) belonging to G(1) have integer coordinate values. That is, in the embodiment, the degree of similarity is calculated to a reference image region (u, v) in which both u, v are integers, and the degree of similarity is interpolatingly estimated to a reference image region (u, v) in which any of u, v has a non-integer coordinate.

A degree of similarity calculation method is the same as the first embodiment except the calculation of a rounded threshold value clip_thresh. As one method of calculating clip_thresh(du, dv), it is calculated based on the same definition as clip_thresh 2 of the equation 18. At the time, since (du, dv) are coordinate values less than integers, the template image S(i, j) must be referred to in the 0.5 pixel unit. However, S(i, j) is internally inserted by the same method as W(i, j). As another calculation method, the threshold value is calculated by a calculation equation which is modified to refer to a pixel of an integer coordinate by doubling (du, dv) as clip_thresh4 (du, dv) of an equation 21.

$$\text{clip\_thresh4}(du, dv) = \max\left\{0, -\lambda_1 + \frac{1}{2} \frac{\lambda_2}{|R|} \sum_{(i,j) \in R} |S(i+2du, j+2dv) - S(i, j)|\right\}$$ [Equation 21]

The template matching method of the third embodiment is executed by the same procedure as the first embodiment except the points described above.

Since the embodiment can realize the template matching with 0.5 pixel accuracy by the less number of times of degree of similarity calculation likewise the template matching with one pixel accuracy, it can execute matching with high accuracy as compared with the method of executing template matching rough with one pixel accuracy. The embodiment is effective when it is applied to a first matching step of the multistep search method for executing matching with 0.5 pixel accuracy in a second step.

Example 1

As a first example of the present invention, there will be explained an example that makes use of the template matching method based on the present invention in a first matching processing step in a template matching processing based on a multistep search method using two-steps and a reduced image.

In the example, it is assumed that a template image S(i, j) is a rectangle having 16×16 pixels and that the range of coordinates i, j are integers from 0 or more to less than 16. It is assumed that a reference image W(i, j) is a rectangle having 48×48 pixels and that the range of coordinates i, j are integers from −16 or more to less than 32. It is assumed that the range of a reference image region (u, v) is such that both u, v are integers from −16 or more to 16 or less. The number of pieces of the reference image regions is 33×33=1089 pieces.

Figure 10:
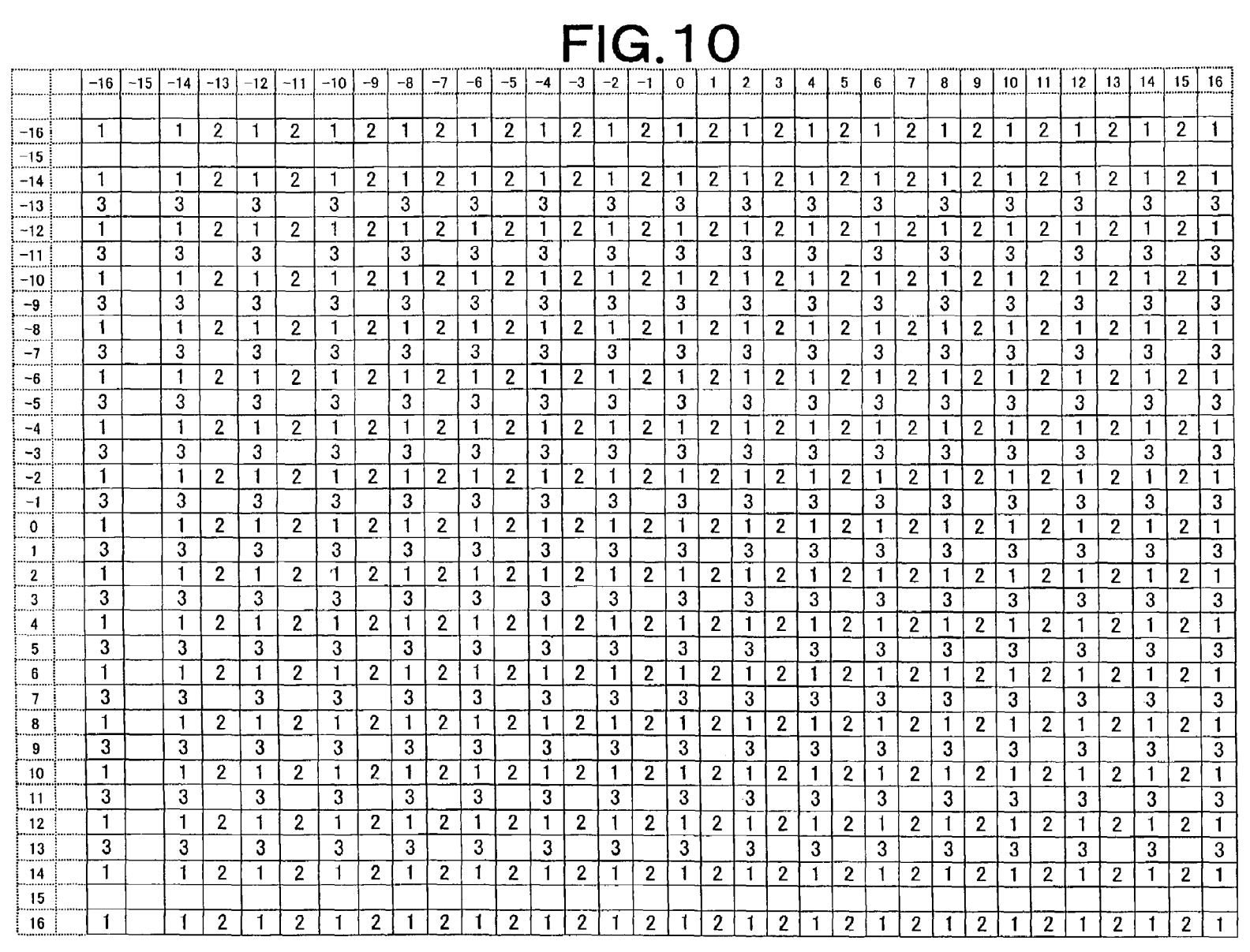

At a first matching step, an image region whose degree of similarity is minimized is detected using an 8×8 template image S2(i, j) reduced to 1/2 vertically and laterally and a 24×24 reference image reduced at the same ratio. FIG. 10 is a schematic view in which the reference image region (u, v) in the embodiment is shown by lattice-like boxes. In the figure, degrees of similarity are calculated to the reference image regions labeled by 1, and then degrees of similarity are interpolatingly estimated to the reference image regions labeled by 2, 3.

It is assumed that a specific matching procedure is the same as the method explained in the second embodiment except that the reference image region is classified according to FIG. 10. It s assumed that the degree of similarity is defined by the equation 19. It is assumed that all the pixels included in the 8×8 template image belong to the group R2. The degree of similarity is interpolated from the degree of similarity of the reference image region having the same positional relation as the reference image regions P, Q of FIG. 8, and an interpolation value is estimated according to the equations 2, 3, 4, 7. The interpolation value is rounded according to the equations 13 and 20.

At a second matching step, the periphery of the image region detected at the first step is searched every second pixel while accurately calculating the degree of similarity using an image before reduction. A search range is set to 9 points in which the difference from the result of the first matching step is −1 or more to 1 or less in both the vertical and lateral directions. It is assumed that the degree of similarity is defined by the equation 1.

Figure 11:
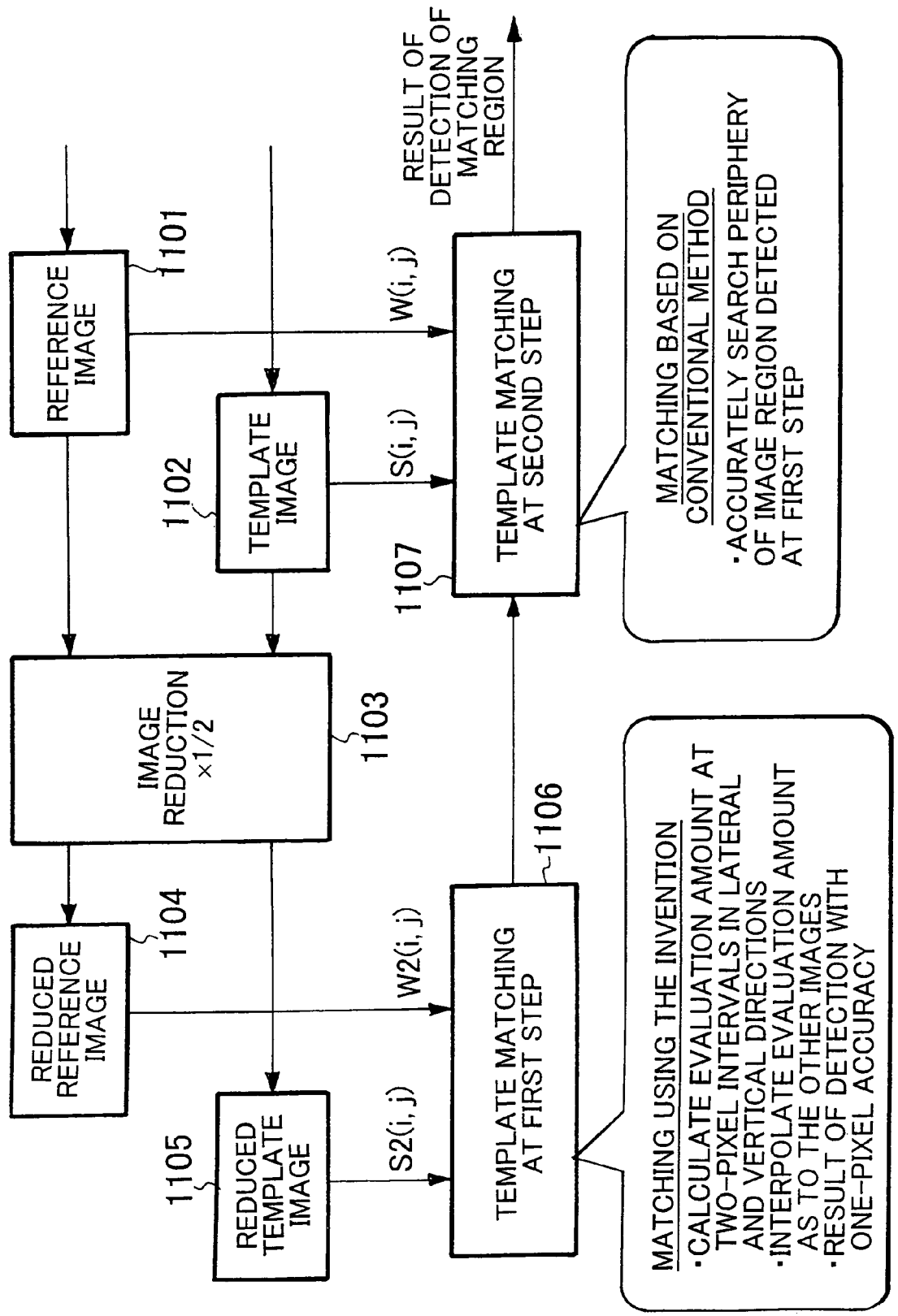
FIG. 11 is a block diagram showing an arrangement of the embodiment of the present invention.

FIG. 11 is a block diagram showing an arrangement of the example. A reference image is input to 1101, and a template image is input to 1102. The two input images are reduced to 1/2 vertically and laterally in 1103, the reduced reference image is stored in 1104, and the reduced template image is stored in 1105. 1106 executes a first step template matching processing from the reduced reference image of 1104 and the reduced template image of 1105, and the coordinates (u, v) of a detected reference image region (u, v) are output to 1107. 1107 executes a second step template matching processing from the reference image of 1101 and the template image of 1102 and outputs the coordinates (u, v) of the reference image region (u, v) showing a result of final matching to the outside.

An effect of the example will be shown by comparison. A conventional example A to which an all search method is applied and a conventional example B based on a multistep search method are prepared as methods to be compared. The conventional example B executes matching by a procedure similar to this example except only a first step matching processing that is different from this example. In the conventional example B, a degree of similarity is not estimated in a first matching step and is calculated only to the reference image regions labeled by "1" in FIG. 10.

A comparison of an amount of calculation will be shown. FIG. 12 shows a result that an amount of calculation necessary to template matching is counted by the number of times of calculation of the difference of pixels. In the count, it is assumed that the difference calculation is executed 256 times when the degree of similarity is calculated by the image before reduction once, 64 times when the degree of similarity is calculated by a reduced image once, and 64 times when a threshold value rounded using the reduced image is calculated once. The amount of calculation does not include the amount of calculation of an estimation processing of other evaluation values, a minimum value detection processing, and image reduction is not included. It can be found from the result that the amount of calculation of the example is not almost different from the conventional example 2 based on the multistep search method and requires only an amount of calculation less than one thirteen the conventional example 1 based on the all search method.

A result of comparison obtained by an experiment of matching accuracy will be shown. To compare the accuracies of the template matching of the example, the conventional example A, and the conventional example B, the template matching processings of them were applied to the estimation of the motion of a moving image. A progressive monochrome image having 720×480 pixels and 30 frames per second was used as an input image, and an image block for minimizing a degree of similarity in the block unit of 16×16 pixels was detected from a frame located just before a present frame with a time lag. To evaluate the matching accuracy, the value, which was obtained by averaging the minimum values of the degrees of similarity obtained by the template matching processing, was used as an index. A smaller index shows that the template matching is executed with a smaller amount of erroneous detection, and a larger index shows a higher erroneous detection probability.

Figure 13:
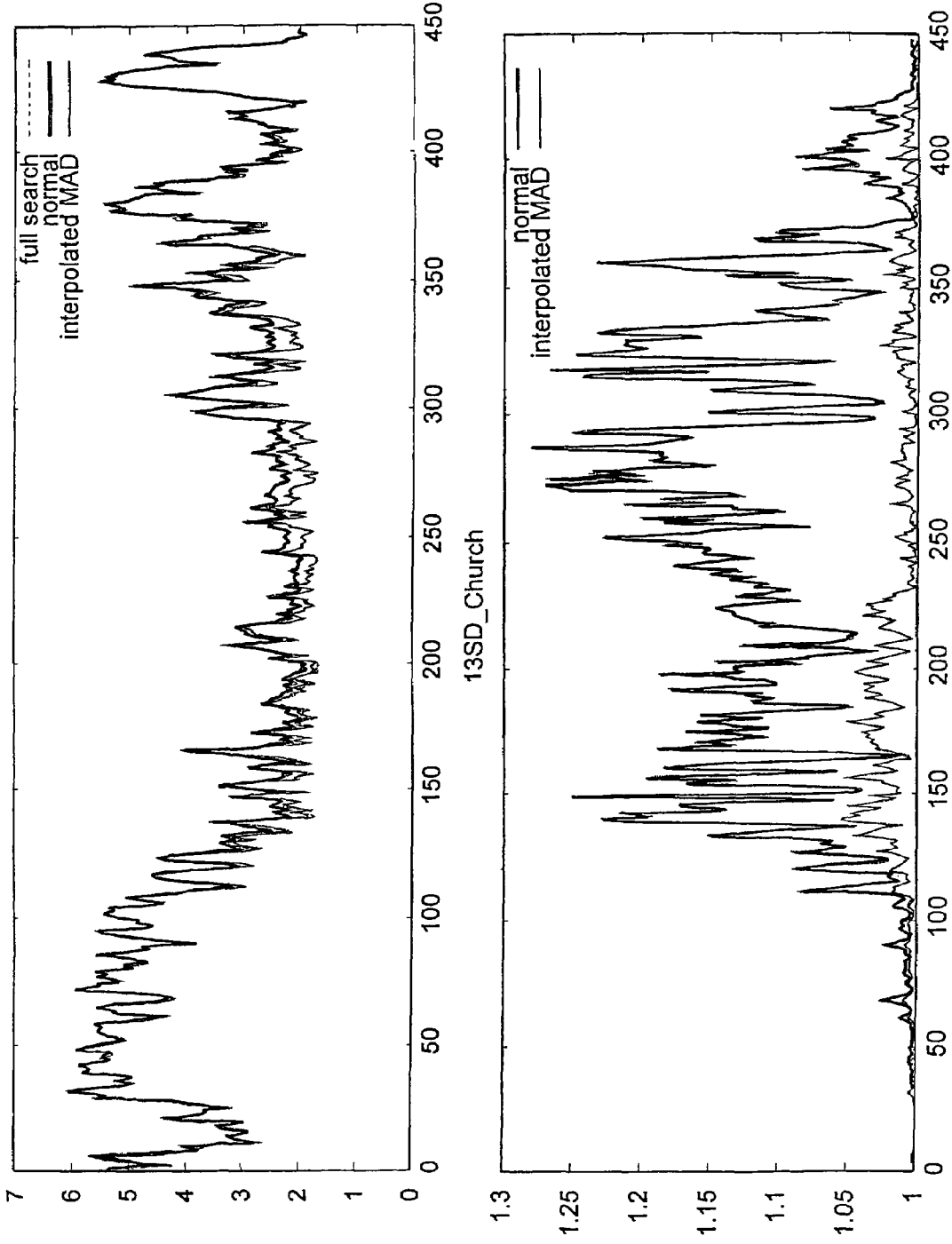
FIG. 13 is a graph showing a result in which the embodiment of the present invention is applied to a motion estimation processing.

FIG. 13 are a set of graphs (a) and (b) showing an average degree of similarity obtained by estimating the motion of a to-be-evaluated moving image 13SD_Church. The graph (a) shows the average degrees of similarity of respective frames, and the lateral axis shows a frame number. Although the average degree of similarity of the example A is minimized in any of the frames, this is because the erroneous detection probability is made to 0 due to the all search method. It can be found from the graph that the average degree of similarity of the conventional example B is greatly increased although this depends on a frame. In contrast, the example shows an average degree of similarity that is not greatly different from the conventional example A.

FIG. 13(b) is a graph showing the ratio of the average degree of similarity of this example to that of the conventional example A, from which the difference between the average degree of similarity of this example and that of the conventional example A can be read outstandingly. The average degree of similarity increased up to about 25% in the conventional example B is suppressed to about 5% in this example. As described above, this example can obtain matching accuracy which is more improved than the conventional example B based on the multistep search method and is near to the conventional example A based on the all search method.

As shown above, in this example, it is possible to realize the template matching having accuracy near to the all search method in an amount of calculation that is not almost different from the conventional example based on the multistep search method.

As described above, the degree of similarity between the template image and the matching reference image region is calculated only to the limited reference image regions that are thinned out at the rough position intervals, and the degree of similarity at the position where it is not calculated is estimated from the calculated degree of similarity and the estimated degree of similarity making use of the gradients independently found in the plural directions. Accordingly, the matching processing can be executed by the small amount of calculation.

Further, even if an image having a degree of similarity, which causes erroneous detection in the conventional multi-step search method, is input, the erroneous detection probability can be prevented.

Further, the value range of the degree of similarity estimated value is limited so that the difference between the degree of similarity estimated value and the degree of similarity of the periphery used for the estimation or the gradient of the degree of similarity does not exceed a threshold value. As a result, even if a noise component is added to the reference image and the template image, an interpolation and estimation error caused by noise can be reduced, and thus matching accuracy can be increased.

The threshold value is uniquely defined to interpolating direction vector that is obtained by subtracting the coordinates of the reference image region to be interpolated from the coordinates of the nearby reference image region. As a result, since it is sufficient to determine the threshold value once to each interpolating direction vector, it is not necessary to set the threshold value each time the position of the reference image region is changed, from which a necessary amount of calculation can be reduced.

The threshold value is determined based on the value for evaluating the degree of similarity between the image region, which is obtained by moving the template image region in the same direction as or the opposite direction to the interpolating direction vector, and the template image region. The threshold value determined by the method can prevent deterioration of the matching accuracy due to noise even if the noise component is added to the reference image and the template image because it can approximate the upper boundary of the magnitude of an evaluation value gradient. Further, since the threshold value is set to each interpolating direction vector, even if an image signal having a frequency characteristic different in a horizontal direction and a vertical direction is input, accurate matching can be executed.

The estimation of the degree of similarity by the interpolation is executed only to the candidate regions located in the vicinity of the reference image region that locally minimizes the degree of similarity calculated or estimated up to a certain time. With this operation, since the amount of calculation necessary to estimate the degree of similarity can be reduced, it is possible to further reduce the amount of calculation of the template matching according to the present invention.

The method explained above can be realized by a computer which reads a program from a program and executes it.

The invention claimed is:

1. A template matching method of detecting a position of an image region similar to a template image region from on a reference image, said method comprising the steps of:
    calculating a similarity of the image region to the template image region at rough position intervals;
    estimating a similarity at a position, where the similarity is not calculated, making use of directional gradients of similarity obtained independently in a plurality of directions from the calculated values of similarity;
    determining, based on the calculated values of similarity obtained in the calculating step and the estimated value of similarity obtained in the estimating step, a position having a small calculated or estimated value of the similarity as a position of a similar image region; and
    restricting a value range of the estimated similarity value such that a difference between the estimated similarity value and the similarity of a periphery used for the estimation or the gradient of the similarity does not exceed a threshold value,
    wherein the calculating step, estimating step, determining step and restricting step are performed by a processor.

2. A template matching method according to claim 1, further comprising detecting the position of the similar image region at a search step before the final step thereof.

3. A template matching method according to claim 1, further comprising a step of determining the threshold value based on a magnitude of the similarity calculated from the template image region and an image region, which is obtained by moving the template image region in a same direction or in a opposite direction to an estimation direction vector obtained by subtracting a position of a nearby image region from a position where the similarity is estimated.

4. A template matching method according to claim 1, further comprising a step of estimating, when five reference image regions A, B, C, D, E are sequentially located on a straight line, a degree of similarity at the image region C from an interpolation value extrapolated assuming gradient continuity from a similarity in the image regions A, B and from an interpolation value extrapolated assuming gradient continuity from a similarity in the image regions D, E in the estimation of the degree of similarity.

5. A template matching apparatus for detecting the position of an image region similar to a template image region from on a reference image, comprising:
    means for calculating a similarity of the image region to the template image region at rough position intervals;
    means for estimating a similarity at a position, where the similarity is not calculated, making use of gradients of the similarity obtained independently in a plurality of directions from the calculated values of similarity;
    means for determining, based on the calculated values of similarity obtained by the means for calculating and the estimated value of similarity obtained by the means for estimating, a position having a small calculated or estimated value of the similarity as a position of a similar image region; and
    means for restricting a value range of the estimated similarity value such that a difference between the estimated similarity value and the similarity of a periphery used for the estimation or the gradient of the similarity does not exceed a threshold value.

6. A template matching apparatus for narrowing down the position of a similar image region stepwise based on a multistep search method, further comprising detecting the position of the similar image region by the template matching apparatus according to claim 5 at a search step before the final step thereof.

7. A template matching apparatus according to claim 5, further comprising means for determining the threshold value based on the magnitude of the similarity calculated from the template image region and an image region, which is obtained by moving the template image region in a same direction as or in a opposite direction to an estimation direction vector obtained by subtracting the position of the nearby image region from the position where the degree of similarity is estimated.

8. A template matching apparatus according to claim 5, further comprising means for estimating, when five reference image regions A, B, C, D, E are sequentially located on a straight line, a degree of similarity at the image region C from an interpolation value extrapolated assuming gradient continuity from a similarity in the image regions A, B and from an interpolation value extrapolated assuming gradient continuity from a similarity in the image regions D, E in the estimation of the degree of similarity.

9. A non-transitory computer readable recording medium that records a program for causing a computer to execute a template matching method of detecting the position of an image region similar to a template image region from on a reference image, wherein:
- the method calculates a similarity of the image region to the template image region at rough position intervals;
- the method estimates a similarity at a position, where the similarity is not calculated, making use of gradients of similarity obtained independently in a plurality of directions from the calculated values of similarity;
- the method determines, based on the calculated values of similarity obtained in the calculating step and the estimated value of similarity obtained in the estimating step, a position having a small calculated or estimated value of the similarity as a position of a similar image region; and
- the method restricts a value range of the estimated similarity value such that a difference between the estimated similarity value and the similarity of a periphery used for the estimation or the gradient of the similarity does not exceed a threshold value.

10. A non-transitory computer readable recording medium that records a program for causing a computer to execute a template matching method of narrowing down the position of a similar image region stepwise based on a multistep search method, characterized in that the template matching method detects the position of the similar image region by being executed by a computer based on a program recorded on the recording medium according to claim 9 at a search step before the final step thereof.

11. A non-transitory recording medium according to claim 9, wherein the method determines the threshold value based on the magnitude of the similarity calculated from the template image region and an image region, which is obtained by moving the template image region in the same direction as or in the opposite direction to an estimation direction vector obtained by subtracting the position of the nearby image region from the position where the degree of similarity is estimated.

12. A non-transitory recording medium according to claim 9, wherein the method estimates, when five reference image regions A, B, C, D, E are sequentially located on a straight line, the degree of similarity at the position C from an interpolation value extrapolated assuming gradient continuity from the similarity in the image regions A, B and from an interpolation value extrapolated assuming gradient continuity from the similarity in the image regions D, E in the estimation of the degree of similarity.

* * * * *